US008695397B2

(12) United States Patent
Sacquard et al.

(10) Patent No.: US 8,695,397 B2
(45) Date of Patent: Apr. 15, 2014

(54) CALIBRATION OF A SENSOR FOR PROCESSING VALUE DOCUMENTS

(75) Inventors: David Sacquard, Munich (DE); Jurgen Schutzmann, Pfaffenhofen (DE)

(73) Assignee: Giesecke & Devrient GmbH, Munich (DE)

( * ) Notice: Subject to any disclaimer, the term of this patent is extended or adjusted under 35 U.S.C. 154(b) by 480 days.

(21) Appl. No.: 13/119,856

(22) PCT Filed: Sep. 18, 2009

(86) PCT No.: PCT/EP2009/006771
§ 371 (c)(1), (2), (4) Date: Mar. 18, 2011

(87) PCT Pub. No.: WO2010/031576
PCT Pub. Date: Mar. 25, 2010

(65) Prior Publication Data

US 2011/0174051 A1 Jul. 21, 2011

(30) Foreign Application Priority Data

Sep. 19, 2008 (DE) ........................ 10 2008 048 043

(51) Int. Cl.
*G01N 21/86* (2006.01)
*G01P 21/00* (2006.01)
*G07D 11/00* (2006.01)

(52) U.S. Cl.
USPC ......... 73/1.79; 250/252.1; 250/559.1; 356/71

(58) Field of Classification Search
USPC ................. 73/1.79; 250/252.1, 559.1; 356/71
See application file for complete search history.

(56) References Cited

U.S. PATENT DOCUMENTS 4,179,685 A 12/1979 O'Maley
4,314,281 A * 2/1982 Wiggins et al. ............... 358/406
4,406,996 A * 9/1983 Oka .............................. 340/674
4,516,031 A 5/1985 Kaule et al.
4,559,452 A * 12/1985 Igaki et al. ............... 250/559.36

(Continued)

FOREIGN PATENT DOCUMENTS

DE 2749641 A1 5/1978
EP 1353302 A2 10/2003

(Continued)

OTHER PUBLICATIONS

Search Report of German Patent and Trademark Office regarding German Patent Application No. 10 2008 048 043.6, Sep. 28, 2009.

(Continued)

*Primary Examiner* — David A Rogers
(74) *Attorney, Agent, or Firm* — Workman Nydegger

(57) ABSTRACT

The invention relates to a method for calibrating a sensor which is configured for checking value documents. The sensor senses measurement signals of a calibration medium which is transported past the sensor. From the sensed measurement signals there are determined reference data of the calibration medium and there is moreover determined a transport property of the calibration medium, e.g. the transport speed or the transport position of the calibration medium. From the transport property there is ascertained at least one correction value which is employed for correcting the sensed reference data of the calibration medium. After the calibration, the corrected reference data are compared with target data of the calibration medium. Optionally there is then effected an adjustment of the sensor using the corrected reference data.

15 Claims, 1 Drawing Sheet

(56) References Cited

U.S. PATENT DOCUMENTS

| | | | | | |
|---|---|---|---|---|---|
| 4,587,434 | A | | 5/1986 | Roes et al. | |
| 4,931,963 | A | * | 6/1990 | Kimura et al. | 702/184 |
| 4,984,280 | A | | 1/1991 | Abe | |
| 5,091,654 | A | * | 2/1992 | Coy et al. | 250/559.29 |
| 5,130,525 | A | * | 7/1992 | Ryon | 250/208.1 |
| 5,680,472 | A | * | 10/1997 | Conant | 382/135 |
| 5,764,346 | A | * | 6/1998 | Jard et al. | 356/71 |
| 5,831,740 | A | | 11/1998 | Terauchi | |
| 5,923,413 | A | * | 7/1999 | Laskowski | 356/71 |
| 6,044,952 | A | * | 4/2000 | Haggerty et al. | 194/207 |
| 6,101,266 | A | | 8/2000 | Laskowski et al. | |
| 6,333,511 | B1 | * | 12/2001 | Talmi | 250/559.36 |
| 6,649,925 | B2 | * | 11/2003 | Talmi | 250/559.1 |
| 6,900,448 | B1 | * | 5/2005 | Thompson | 250/559.1 |
| 7,034,324 | B2 | * | 4/2006 | Voser | 250/556 |
| 7,040,534 | B2 | * | 5/2006 | Turocy et al. | 235/379 |
| 8,304,713 | B2 | * | 11/2012 | Pradel | 250/252.1 |
| 2007/0031021 | A1 | | 2/2007 | Natori | |

FOREIGN PATENT DOCUMENTS

| | | | |
|---|---|---|---|
| EP | 1734486 | A2 | 12/2006 |
| RU | 2183350 | C2 | 6/2002 |
| WO | 98/21697 | A2 | 5/1998 |
| WO | 2006072565 | | 7/2006 |

OTHER PUBLICATIONS

International Search Report in PCT/EP2009/006771, Feb. 4, 2010.

* cited by examiner

CALIBRATION OF A SENSOR FOR PROCESSING VALUE DOCUMENTS

BACKGROUND OF THE INVENTION

1. Field of the Invention

This invention relates to a method for calibrating a sensor which is configured for checking value documents, e.g. in an apparatus for value document processing. Moreover, the invention relates to a corresponding sensor and to a corresponding value document processing apparatus.

2. Related Art

For checking value documents there are usually employed sensors with which the type of the value documents is determined and/or with which the value documents are checked for authenticity and/or their state. Such sensors are employed e.g. for checking bank notes, checks, identity cards, credit cards, check cards, tickets, vouchers and the like. The value documents are checked in an apparatus for value document processing which contains one or several different sensors, depending on the value document properties to be checked. The sensors are usually checked with regard to their correct operability at certain time intervals or because of a current event. For checking a sensor, it is first calibrated and subsequently adjusted, if necessary. The calibration is usually effected using calibration media which are supplied to the sensor and from which the sensor senses measurement signals. The calibration media can be configured for checking one or several properties of an individual sensor, or for checking several or all relevant properties of several or all relevant sensors of the apparatus for value document processing. For example, the calibration media used for calibrating bank-note sensors are paper sheets with known, predefined properties or also bank notes specially prepared for checking the sensors.

In some apparatuses for value document processing, the value documents are transported in the apparatus past the sensors employed for checking. To calibrate the sensors, there is transported past the sensors a calibration medium, instead of the value documents, whereby the sensors sense measured values of the calibration medium. The measured values are compared with target values which are associated with the calibration medium. If the measured values of the calibration medium deviate from the target values of the calibration medium, an adjustment of the relevant sensor is usually carried out, whereby the sensor is if possible so set that it delivers at least approximately the target values upon measurement of the calibration medium. The thus adjusted sensor is subsequently employed for checking value documents.

It is an object of the present invention to specify a method for calibrating a sensor configured for checking value documents which makes possible a precise calibration of the sensor.

SUMMARY OF THE INVENTION

The method according to the invention is employed for calibrating a sensor configured for checking value documents. The value documents are checked by the sensor e.g. in an apparatus for value document processing which has a transport system for transporting the value documents past the sensor along a transport direction. The apparatus can have a calibrating mode in which one or several sensors of the apparatus are calibrated by the method according to the invention. The sensor which is calibrated by the method according to the invention is e.g. a sensor for checking optical, magnetic, electrical, mechanical or also geometrical properties of the value documents. Upon checking of the value documents, the type of the value documents is determined and/or the value documents are checked for authenticity and/or for their state. The apparatus can moreover be equipped with input and output pockets for supplying and removing the value documents to and from the apparatus.

For calibrating the sensor, a calibration medium is transported past the sensor along the transport direction, whereby the sensor senses measurement signals of the calibration medium. In particular, the measurement signals sensed by the sensor contain first measurement signals which the sensor senses from at least one reference area of the calibration medium, and second measurement signals which the sensor senses from at least one marking of the calibration medium. From the sensed measurement signals, in particular from the first measurement signals, there are determined reference data of the calibration medium. Moreover, there is determined from the sensed measurement signals, in particular from the second measurement signals, at least one transport property of the calibration medium, whereby the transport property is determined quantitatively.

As reference data there can be employed e.g. the level of the measurement signal sensed from the reference area. Alternatively, there can be employed as reference data also other properties of the measurement signal, for example the area of the measurement signal, etc. In the case of a multitrack sensor there can, for each measuring track of the sensor, be determined from the respectively sensed measurement signal separate reference data, e.g. a respective reference value for each measuring track.

The transport properties relate e.g. to the transport speed of the calibration medium along the transport direction and/or the position of the calibration medium in the transport plane of the calibration medium, in particular a skewed position of the calibration medium and/or a position of the calibration medium perpendicular to the transport direction. Upon the quantitative determination of the at least one transport property there are quantitatively determined e.g. the transport speed and/or the position of the calibration medium in the transport plane. The position of the calibration medium can be stated quantitatively e.g. by the shift of the calibration medium perpendicular to the transport direction relative to a predefined, ideal position of the calibration medium. The ideal position can be predefined e.g. relative to the sensor, in particular to the measuring tracks of the sensor.

From the transport property, in particular from the transport speed of the calibration medium and/or from the position of the calibration medium, there is subsequently ascertained at least one correction value. Subsequently, the previously determined reference data of the calibration medium are corrected using the one, or using the several, ascertained correction values. For example, there is ascertained for each measuring track of the sensor a separate correction value. In the method according to the invention, the reference data can also be corrected in multiple fashion using correction values, whereby said corrections can be effected successively or simultaneously. For example, there are quantitatively determined for this purpose several different transport properties of the calibration medium. For each of the different transport properties there can then be ascertained separate correction values which are employed for correcting the reference data. Alternatively, there can also be ascertained from the different transport properties common correction values which are employed for correcting the reference data. The reference data can also be corrected, quasi indirectly, by the sensed measurement signals of the reference area already being corrected using the correction values. By the correction of the measurement signals of a measuring track there is finally also automatically effected a correction of the reference data of the particular measuring track.

For ascertaining the at least one correction value, use can be made of results of earlier measurements of the calibration medium which were carried out under different transport conditions, e.g. at different transport speeds and/or with different positions of the calibration medium in the transport plane. For example, the results of earlier measurements are entered in a value table which contains the correction values measured under certain transport conditions, in dependence on the transport conditions, and which is kept available for calibrating the sensor. To ascertain the correction values, there are picked out from the value table those transport conditions that correspond, at least approximately, to the quantitatively determined transport properties, and the correction values associated with said transport conditions are taken from the value table. Alternatively, the relation between transport conditions and correction values can also be ascertained by simulation calculations. Alternatively, the correction values can also be calculated from the transport conditions or from the transport properties on the basis of geometrical considerations. For example, the size of the proportion of the measuring tracks swept over by the reference area can be calculated on the basis of the position of the calibration medium. In particular, there can be calculated for each measuring track that surface proportion that is covered by the reference area of the calibration medium upon transport of the calibration medium past the measuring track. The ascertained correction values are subsequently used to correct the previously determined reference data of the calibration medium.

In a special embodiment example, there is stated in the value table for each transport speed a respective percentage correction factor by which the measurement signals of the sensor change upon a deviation of the transport speed from a nominal transport speed. By means of the value table there is determined that correction factor that belongs to the quantitatively determined transport speed, i.e. to the actual transport speed of the calibration medium. For correcting the reference data of the calibration medium, the measurement signals, or alternatively the reference data themselves, are multiplied by the correction factor from the value table. In this manner it is possible to compensate the influence of irregularities of the transport speed on the measurement signals of the reference area, or on the reference data of the calibration medium.

By the sensor calibration according to the invention there are determined corrected reference data which can subsequently be employed for adjusting the sensor. The corrected reference data are compared with target data which are associated with the calibration medium, in particular the reference area of the calibration medium. The target data can contain one or several fixed numerical values, e.g. several numerical values for different portions of the reference area. The fixed numerical values can be provided with fluctuation ranges which permit acceptable deviations from the target data within a certain value domain. If the corrected reference data deviate from the target data of the calibration medium, an adjustment of the sensor is necessary. Adjustment of the sensor can be effected automatically or only after a corresponding confirmation from outside, e.g. by an operator who has prompted the calibration of the sensor. For adjusting the sensor one e.g. changes parameters which the sensor employs for processing value document measurement signals which the sensor senses upon the checking of value documents. Alternatively, when adjusting the sensor one can also change hardware settings of the sensor, e.g. upon very great deviations of the corrected reference data from the target data.

In one embodiment example, the sensor which is calibrated by the method according to the invention has several measuring tracks which are arranged perpendicular to the transport direction at a certain measuring track period. For example, there is ascertained upon calibration, for each of the measuring tracks of the sensor, a respective separate correction value. Using the correction value of the particular measuring track, the reference data of the particular measuring track are then corrected. The sensor has e.g. a calibrating mode in which it is calibrated by the method according to the invention. The sensor can be configured to carry out some of the steps of the method according to the invention for calibration itself. For this purpose, the sensor can be equipped with a calibrating device which can determine at least one transport property of the calibration medium. Additionally, the calibrating device can be configured to ascertain at least one correction value from the at least one transport property and/or to correct the reference data using the at least one correction value. In particular, the sensor can also be configured to adjust itself.

Alternatively or additionally, the apparatus for value document processing can also be equipped with a calibrating device. The apparatus can be configured to calibrate the sensor, and optionally adjust it, by the method according to the invention. For example, the calibrating device of the apparatus is configured to determine the at least one transport property of the calibration medium and/or to ascertain at least one correction value from the at least one transport property and/or to correct the reference data using the at least one correction value. The just stated method steps can also be carried out partly by the calibrating device of the apparatus and partly by the calibrating device of the sensor. Alternatively, there can also be employed for calibration, in particular for carrying out all or some of the just stated method steps, an external calibrating device which can be connected to the apparatus, e.g. a portable calibrating device which can be employed for several apparatuses for value document processing.

The apparatus can moreover have an identifier sensor for ascertaining an identifier of a calibration medium supplied to the apparatus, and a data storage device which stores several identifiers and for each of said stored identifiers stores information about for which sensor or sensors with regard to which property and/or properties a calibration is to be carried out using the calibration medium bearing the associated identifier.

The calibration medium employed for calibration has at least one reference area from whose measurement signals there are determined reference data of the calibration medium, and at least one marking from whose measurement signals there are determined transport properties of the calibration medium. The calibration medium can have one or several reference areas for the sensor to be calibrated. The several reference areas can be arranged on the calibration medium e.g. along a line or in a certain pattern. Additionally, the calibration medium can also have one or several reference areas for calibrating further sensors. As a reference area and as markings there are preferably employed different areas of the calibration medium which, however, can be portions of the same print, for example of the same printed image. The at least one marking and the at least one reference area are preferably produced with high positional precision relative to each other, so that their relative position is precisely defined. This makes it possible to obtain a high exactness of calibration. Preferably, the markings and the reference area are produced in the same method step, e.g. in the same printing step.

The calibration medium is e.g. a flat object which is designed similarly to a value document to be checked with the sensor, e.g. a printed paper sheet or a selected value document. For its identification, the calibration medium can contain an identifier. Moreover, the calibration medium can also contain information about which sensors can be calibrated with the calibration medium and/or the target data that are associated with the calibration medium. This information can be contained e.g. in a character string and/or in a bar code and/or in an electronic data carrier of the calibration medium. In one embodiment example, the calibration medium has several markings which are spaced apart perpendicular to the transport direction of the calibration medium, whereby the distance between the markings perpendicular to the transport direction amounts in particular to a multiple of the measuring track period of the sensor. The markings can also be mutually offset in the transport direction. The width of the markings can amount e.g. to precisely one width of a measuring track perpendicular to the transport direction or also an integral multiple of the width of a measuring track. The markings employed can be certain prints or printed image areas, but edges of the calibration medium or holes formed therein, etc., can also be employed as markings.

The sensor to be calibrated and the apparatus are configured for checking value documents which are transported past the sensor in the same way as the calibration medium. Upon calibration of the sensor and upon checking of the value documents there are sensed measurement signals of the calibration medium transported past and of the value document, respectively. For calibrating the sensor and for checking the value documents there are provided different operating modes of the sensor and/or of the apparatus, however, which can be set from outside and in which the sensed measurement signals are employed differently. In the calibrating mode the measurement signals of the calibration medium are employed for ascertaining the state of the sensor, while in the checking mode the measurement signals of the value documents are employed for determining the authenticity and/or the type and/or the state of the value documents.

For calibrating the sensor there is preferably employed a set of calibration media, e.g. a pack of 100 calibration media which is supplied to the apparatus for value document processing. By the calibration with a multiplicity of calibration media it is possible to eliminate further fluctuations of the measuring system and to increase the exactness of the calibration. For calibration, the individual calibration media of the set are transported successively through the apparatus and past the sensor to be calibrated. For example, the calibration media of the set differ only in their identifier, while the reference area or areas and the at least one marking are the same. For each individual calibration medium of the set, reference data are determined and the particular reference data are corrected using a correction value ascertained for the particular calibration medium, said value being derived from the particular transport property or properties of the particular calibration medium. A correction of the reference data is thus carried out individually for each calibration medium of the set in order to ascertain corrected reference data for the particular calibration medium. Subsequently, there is calculated an average of the corrected reference data of the calibration media of the set. Said average is compared with a target range around a target average which is expected for the particular set of calibration media. The target average and/or the target range can be introduced into the apparatus for value document processing via a corresponding interface, e.g. by manual input, via a network connection or via a data carrier, e.g. a USB stick, which is associated with the set of calibration media. If the average calculated for the calibration media of the set is outside the target range of the target average, an adjustment of the sensor is carried out. The target range corresponds e.g. to a maximum acceptable deviation from the target average.

For carrying out the calibration of the sensor, certain calibration media of the set can be selected. If e.g. an excessive deviation of the transport properties from the expected transport properties is ascertained with one calibration medium, said calibration medium and its measuring data can be ignored for calibrating the sensor. The average is then formed from the corrected reference data of the remaining calibration media of the set, i.e. of those calibration media whose transport properties lie within certain tolerable limits.

DESCRIPTION OF THE DRAWINGS

Hereinafter the invention will be explained by way of example with reference to the following figures.

There are shown.

DETAILED DESCRIPTION OF PREFERRED EMBODIMENTS OF THE INVENTION

Figure 1A:
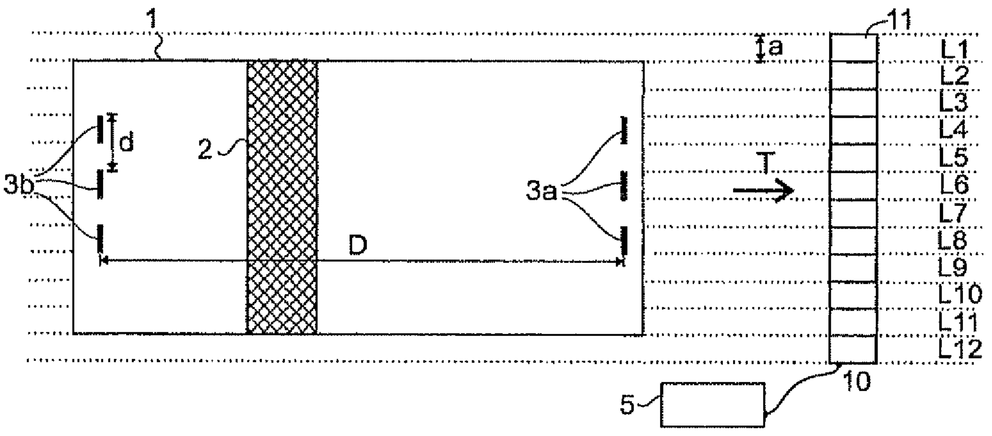
FIG. 1*a* a calibration medium being transported past a sensor in the ideal position, FIG. 1*b* a calibration medium being transported past the sensor in a high running position, FIG. 1*c* a calibration medium being transported past the sensor in a skewed position.
Figure 1B:
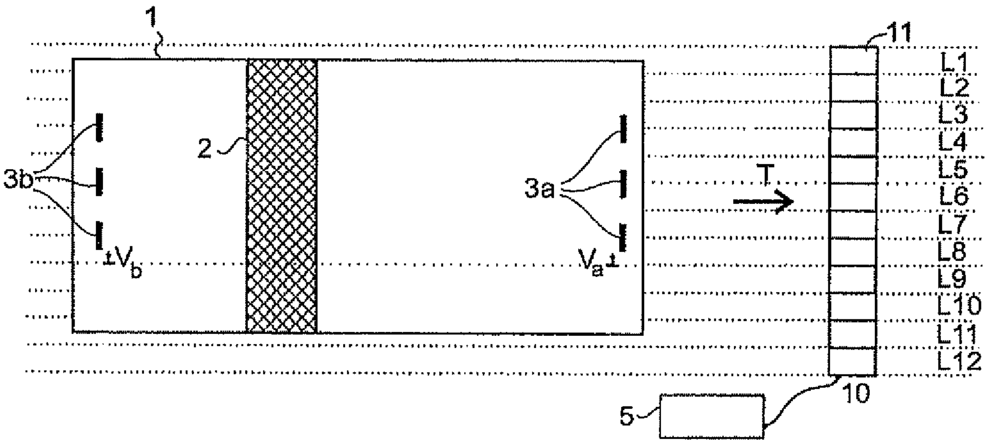
Figure 1C:
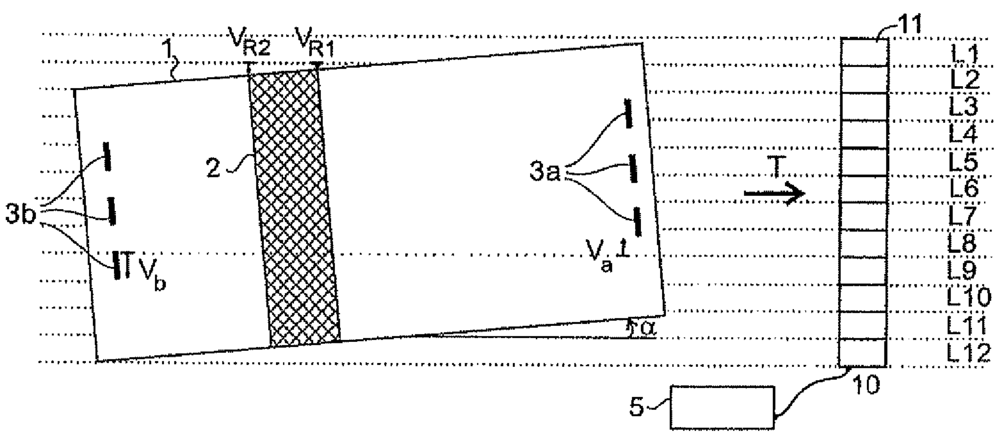

In FIGS. 1*a-c* there is shown a first embodiment example in which a calibration medium 1 is employed for calibrating a sensor 10 and for this purpose is trans-ported along a transport direction T past the sensor 10, whereby the latter senses measurement signals of the calibration medium 1. The shown arrangement can be arranged in an apparatus for value document processing in which value documents are checked using the sensor 10. The sensor 10 is connected to a calibrating device 5 which can be arranged e.g. in the housing of the sensor 10 or outside the sensor 10.

The calibration medium 1 has a reference area 2 in which there is applied a certain reference material from which the sensor 10 senses certain target data in the ideal case, if it is optimally adjusted. The reference material can for example be distributed homogeneously in the reference area 2. In the case of a magnetic sensor 10 the reference material can contain e.g. magnetic pigments. In the case of an optical sensor 10 the reference material can have e.g. fluorescent or phosphorescent pigments or one or several certain colors. Outside the reference area 2 the calibration medium 1 moreover has several markings 3*a*, 3*b* which are so configured that the sensor 10 also senses measurement signals therefrom. The markings 3*a*, 3*b* can e.g. likewise be produced from the reference material. For producing the reference area 2 and the markings 3*a*, 3*b* the reference material was printed on the calibration medium 1 in the same method step. In this specific embodiment example there are respectively applied at the beginning and at the end of the calibration medium 1 three front markings 3*a* and three back markings 3*b*, which are respectively arranged along a line perpendicular to the transport direction T.

In the embodiment example of FIGS. 1*a-c*, the sensor 10 has twelve measuring tracks L1-L12 which are arranged along a line perpendicular to the transport direction T of the calibration medium 1 at a measuring track period a. For each of the measuring tracks L1-L12 there is provided a respective sensor element 11 which senses measurement signals of the calibration medium 1 transported past the sensor 10, namely, both measurement signals of the reference area 2. whose levels will hereinafter be designated R1-R12, and measurement signals of the markings 3. whose levels will hereinafter be designated M1-M12. The calibration medium 1 is configured specifically for calibrating the sensor 10. In the present example, the calibration medium 1 is adapted to the sensor 10 by the distance d between the markings 3*a*, 3*b* amounting to a multiple of, here twice, the measuring track period a. Furthermore, in the shown embodiment example, the extension of the markings 3*a*, 3*b* perpendicular to the transport direction T is also chosen such that it corresponds to the measuring track width of the sensor 10, which in this example is equal to the measuring track period a.

In the case of FIG. 1*a*, the calibration medium 1 is transported past the sensor 10 in the ideal position. The markings 3*a*, 3*b* thereby deliver the measurement signal levels M4, M6 and M8 in the measuring tracks L4, L6 and L8, while the measuring tracks L1-L3, L5, L7 and L9-L12 capture only negligible measurement signals from the markings 3*a*, 3*b*. Moreover, the measuring tracks L2-L11 swept over by the calibration medium 1 capture the measurement signal levels R2-R11 of the reference area 2, while the measuring tracks L1 and L12 arranged outside the calibration medium 1 capture only negligible measurement signals from the reference area 2.

In FIG. 1*b* there is shown a non-ideal transport position in which the calibration medium 1 is transported past the sensor 10 in a high running position. Here, the calibration medium 1 is shifted upward in the transport plane, e.g. due to unavoidable irregularities upon transport of the calibration medium 1. The size of the shift of the front and back markings 3*a* and 3*b* will hereinafter be designated $V_a$ and $V_b$, respectively. In FIG. 1*b* said shifts $V_a$ and $V_b$ are shown by way of example respectively by the lowermost of the markings 3*a* and 3*b* relative to the lower edge of the measuring track L8. In comparison to the ideal position from FIG. 1*a*, the measuring track L11 now detects a reduced measurement signal level R11 of the reference area 2, because the measuring track L11 is swept over only partly by the reference area 2. Without consideration of the high running position one would therefore obtain falsified reference data for said measuring track L11 on account of the reduced measurement signal level R11. However, according to the invention the high running position is considered. On account of the high running position, a changed measurement signal is also measured from the markings 3*a*, 3*b* of the calibration medium 1 in some of the measuring tracks. In comparison to the ideal position from FIG. 1*a*, the measuring tracks L4, L6 and L8 respectively detect reduced measurement signal levels M4, M6 and M8 of the markings 3*a*, 3*b*. Moreover, the measuring tracks L3, L5 and L7 now also respectively detect non-negligible measurement signal levels M3, M5 and M7 of the markings 3*a*, 3*b*. The transport position of the calibration medium can be determined quantitatively from the measurement signal levels M4, M6 and M8 and from the measurement signal levels M3, M5 and M7. To calculate the extent of the high running position, the shifts $V_a$, $V_b$ of the calibration medium 1 perpendicular to the transport direction T are ascertained in this example by linking the measurement signal levels of neighboring measuring tracks. For example, the operations (M4–M3)/M4, (M6–M5)/M6 and (M8–M7)/M8 deliver in each case approximately the numerical value 1 in the case of the ideal position from FIG. 1*a*. In a high running position, as in FIG. 1*b*, there results a clearly reduced numerical value: If the calibration medium 1 is shifted upward e.g. by half a measuring track period a, said operations would deliver in each case approximately the numerical value 0. Shifts $V_a$, $V_b$ lying therebetween can be calculated by interpolation. To determine the transport position of the calibration medium 1 more precisely, the shifts $V_a$, $V_b$ can also be determined in each case for all three front and back markings 3*a*, 3*b*.

One can proceed analogously upon a low running position of the calibration medium 1 whereby the calibration medium 1 is transported shifted downward in the transport plane. In comparison to the ideal position from FIG. 1*a*, the measuring tracks L4, L6 and L8 again respectively detect reduced measurement signal levels upon a low running position, while the measuring tracks L5, L7 and L9 respectively detect non-negligible measurement signal levels M5, M7 and M9 of the markings 3*a*, 3*b*. In contrast to the high running position, the measuring track L9 thus now delivers a non-negligible measurement signal, instead of the measuring track L3. High running position and low running position can therefore be distinguished from each other e.g. by comparing the measurement signal levels M3 and M9. Thus, the difference of the measurement signal levels M3 and M9 delivers results with different signs upon a high running position and upon a low running position. For example, the shifts $V_a$, $V_b$ are stated with a positive sign upon a high running position, and the shifts $V_a$, $V_b$ with a negative sign upon a low running position. For quantitative determination of the low running position there can be carried out for example the operations (M4–M5)/M4, (M6–M7)/M6 and (M8–M9)/M8, which yield in each case the numerical value 1 upon the ideal position, but deliver reduced numerical values upon a low running position, analogously to the high running position.

FIG. 1*c* shows a further non-ideal transport position in which the calibration medium 1 is transported past the sensor 10 in a skewed position at the angle α to the transport direction T. In contrast to the ideal position and to the high running and low running positions, clearly different measurement signals are captured from the front markings 3*a* and the back markings 3*b* of the calibration medium 1 upon a skewed position. According to FIG. 1*c*, the front markings 3*a* of the calibration medium 1 deliver relatively small measurement signal levels M4, M6 and M8, but relatively great measurement signal levels M3, M5 and M7. The back markings 3*b* of the calibration medium 1 deliver almost infinitesimal measurement signal levels M4, M6 and M8, but relatively great measurement signal levels M5, M7 and M9. By comparison of the measurement signal levels of the front markings 3*a* with the measurement signal levels of the back markings 3*b*, in particular of the respective measurement signal levels M3 and M9, the skewed position can be recognized. To quantitatively ascertain the skewed position, i.e. the angle α, there are carried out e.g. respectively for the front 3*a* and back markings 3*b* the operations stated above with regard to FIG. 1*b* for quantitatively determining the high running position or the low running position. In the example of FIG. 1*c* there results for the front markings 3*a* a high running position, i.e. a shift $V_a$ with a positive sign, and for the back markings 3*b* a low running position, i.e. a shift $V_b$ with a negative sign. In FIG. 1*c*, said shifts $V_a$ and $V_b$ are shown by way of example respectively by the lowermost of the markings 3*a* and 3*b* relative to the lower edge of the measuring track L8. Thus, sin(α) is calculated from the difference of the shifts $V_a$ of the front markings 3*a* and of the shift $V_b$ of the back markings 3*b* in relation to the distance D between the markings 3*a* and 3*b* in the transport direction T, i.e. $\sin(\alpha)=(V_a-V_b)/D$.

With an inductively working magnetic sensor 10, the skewed position of the calibration medium 1 can also lead to the measurement signal induced at the beginning and at the end of the reference area 2 being reduced on account of the less abrupt beginning and end of the reference area 2. Upon a homogeneous distribution of the reference material in the reference area 2, the different measuring tracks of the magnetic sensor 10 are affected by this reduction of the induced measurement signal at least approximately in the same way. The correction factor by which the level of the induced measurement signal is reduced results in dependence on the angle α. Also with an optical sensor 10, the skewed position can affect the sensed measurement signals. For example, the skewed position of the calibration medium 1 by the angle α, and the resulting skewed position of the reference area 2, cause an increase in the effectively measured length of the reference area 2 along the transport direction T. The particular relation between the angle α and the correction factor can be ascertained e.g. by targeted measurements of the calibration medium 1 in a skewed position, e.g. prior to the calibration, or by simulation calculations.

From the measurement signals of the reference area 2 sensed by the sensor 10 there are determined reference data of the calibration medium 1. As reference data there are employed for each of the measuring tracks L1-L12 e.g. respectively the measurement signal level R1-R12. The reference data R1-R12 are subsequently corrected in dependence on the quantitatively determined shifts $V_a$, $V_b$ of the front and back markings 3*a*, 3*b*, and optionally in dependence on the angle α. For example, for correcting the high running position from FIG. 1*b* the reference data R11 and R1 of the measuring tracks L11 and L1 are corrected, while for the reference data of the measuring tracks L2-L10 and L12 no correction is necessary.

For correcting the reference data of the calibration medium 1 from FIG. 1*c*, it is necessary to correct both the high running position (shift $V_a$) of the markings 3*a* and the low running position (shift $V_b$) of the markings 3*b*, and the skewed position of the calibration medium 1 by the angle α. From the shifts $V_a$ and $V_b$ one first determines—taking into account the known position of the reference area 2 on the calibration medium 1—the shifts $V_{R1}$ and $V_{R2}$ of the edges of the reference area 2 relative to the ideal position of the reference area, which are shown in FIG. 1*c* relative to the upper edge of the measuring track L2. From the negative sign and the size of the two shifts $V_{R1}$ and $V_{R2}$ it follows that in the case of FIG. 1*c* the reference data of the measuring tracks L2 and L12 must be corrected. Accordingly, upon a positive sign of the two shifts $V_{R1}$ and $V_{R2}$ one would have to correct the reference data of the measuring tracks L1 and L11, and upon different signs of the shifts $V_{R1}$ and $V_{R2}$ the reference data of the measuring tracks L1, L2, L11, L12, but only if the size of the shifts does not go beyond the measuring track period a. If the shifts $V_{R1}$, $V_{R2}$ should be greater than the measuring track period a, the reference data of further measuring tracks would also have to be corrected, e.g. of the measuring tracks L3 or L10. To consider the shifts $V_{R1}$ and $V_{R2}$, the reference data of the measuring tracks L2 and L12 can be corrected e.g. using a value table containing correction values ascertained by targeted measurements of the calibration medium 1 upon different transport positions of the calibration medium 1. To also consider the skewed position of the edges, there can be carried out as a further correction of the reference data e.g. a multiplication of the reference data of the measuring tracks by the correction factor determined in dependence on the angle α.

The measurement signals sensed from the reference area 2 can also be influenced by the transport speed of the calibration medium 1 with some sensors, e.g. with magnetic sensors or with optical sensors. By fluctuations of the transport speed of the calibration medium 1 the sensed reference data can hence likewise be falsified. In some embodiment examples the transport speed of the calibration medium 1 is determined quasi on-line, by measurement of the actual transport speed of the calibration medium 1 using the measurement signals of the calibration medium 1. The (actual) transport speed of the calibration medium 1 results e.g. from the time span between the measurement signals of the markings 3*a* and 3*b* of the calibration medium 1, in connection with the known distance D between the markings 3*a* and 3*b* along the transport direction T, cf. FIG. 1*a*. The reference data can then be corrected in dependence on the (actual) transport speed. The correction values required for this purpose can again be determined by measurements of the calibration medium 1 prior to the calibration or by simulation calculations.

The invention claimed is:

1. A method for calibrating a sensor which is configured for checking value documents which are transported past the sensor along a transport direction comprising the steps:

transporting a calibration medium past the sensor along the transport direction, and sensing by the sensor measurement signals of the calibration medium, determining reference data of the calibration medium from the sensed measurement signals, determining at least one transport property of the calibration medium from the sensed measurement signals, ascertaining at least one correction value from the at least one transport property of the calibration medium, correcting the reference data of the calibration medium using the at least one correction value.

2. The method according to claim 1, wherein the reference data are determined from first measurement signals which are sensed by the sensor from at least one reference area of the calibration medium.

3. The method according to claim 1 including determining the at least one transport property from second measurement signals which the sensor senses from one or several markings of the calibration medium, so that the transport property of the calibration medium is determined quantitatively.

4. The method according to claim 1, wherein one of the at least one transport property relates to a transport speed of the calibration medium.

5. The method according to claim 1, wherein one of the at least one transport property relates to a position of the calibration medium in the transport plane of the calibration medium and/or a position of the calibration medium perpendicular to the transport direction.

6. The method according to claim 1, wherein for ascertaining the at least one correction value, using results of measurements of the calibration medium which were carried out under different transport conditions of the calibration medium.

7. The method according to claim 1, including using corrected reference data for adjusting the sensor.

8. The method according to claim 1, including providing the calibration medium with several markings which are spaced apart perpendicular to the transport direction, so that the distance between the markings amounts to a multiple of a measuring track period of the sensor.

9. The method according to claim 1, wherein for calibrating the sensor, using a set of several calibration media which are individually transported successively past the sensor, and for each individual one of the calibration media carrying out the method steps according to claim 1 and determining corrected reference data for each individual one of the calibration media.

10. The method according to claim 9, comprising the steps:

calculating an average from the individual corrected reference data of the calibration media of the set of calibration media, and comparing the calculated average with a target range around a target average which is expected for the set of calibration media.

11. A sensor for checking value documents which are transported past the sensor along a transport direction, said the sensor being configured for being calibrated according to the method of claim 1.

12. The sensor according to claim 11, wherein the sensor comprises a calibrating device arranged to determine at least one transport property of the calibration medium and/or to ascertain at least one correction value from the at least one transport property and/or to correct reference data using the at least one correction value and/or to adjust the sensor by the corrected reference data.

13. An apparatus for processing value documents having a sensor according to claim 11.

14. The apparatus according to claim 13, wherein the apparatus is configured to calibrate the sensor according to the method of claim 1.

15. The apparatus according to claim 13, wherein the apparatus comprises a calibrating device arranged to determine at least one transport property of the calibration medium and/or to ascertain at least one correction value from the at least one transport property and/or to correct reference data using the at least one correction value and/or to adjust the sensor by means of the corrected reference data.

* * * * *